United States Patent [19]
Soeder

[11] Patent Number: 6,065,004
[45] Date of Patent: May 16, 2000

[54] METHOD AND APPARATUS FOR RECORDING AND READING DATE DATA HAVING COEXISTING FORMATS

[75] Inventor: Thomas B. Soeder, West Friendship, Md.

[73] Assignee: RMM, Inc., Columbia, Md.

[21] Appl. No.: 09/000,949

[22] Filed: Dec. 30, 1997

Related U.S. Application Data

[63] Continuation-in-part of application No. 08/795,429, Feb. 5, 1997, Pat. No. 5,737,735, which is a continuation-in-part of application No. 08/645,822, May 14, 1996, Pat. No. 5,644,762.

[51] Int. Cl.$^7$ ..................................................... G06F 17/30
[52] U.S. Cl. ................................................. 707/6; 707/101
[58] Field of Search ........................................ 707/6, 101

[56] References Cited

U.S. PATENT DOCUMENTS

| | | | |
|---|---|---|---|
| 3,996,450 | 12/1976 | Kerkhoff | 235/380 |
| 4,044,347 | 8/1977 | Van Voorhis . | |
| 4,486,857 | 12/1984 | Heckel | 395/769 |
| 4,500,955 | 2/1985 | Chang | 395/888 |
| 4,654,633 | 3/1987 | Tonomura . | |
| 4,752,765 | 6/1988 | Larson . | |
| 4,947,163 | 8/1990 | Henderson et al. | 340/825.31 |
| 5,119,465 | 6/1992 | Jack et al. | 395/500 |
| 5,293,355 | 3/1994 | Widen et al. | 368/19 |
| 5,319,779 | 6/1994 | Chang et al. | 395/600 |
| 5,444,820 | 8/1995 | Tzes et al. | 395/22 |
| 5,473,327 | 12/1995 | Ray et al. | 341/55 |
| 5,600,836 | 2/1997 | Alter | 395/612 |
| 5,630,118 | 5/1997 | Shaughnessy | 395/601 |
| 5,644,762 | 7/1997 | Soeder | 395/606 |
| 5,668,989 | 9/1997 | Mao | 707/101 |
| 5,737,735 | 4/1998 | Soder | 707/6 |
| 5,740,442 | 4/1998 | Cox et al. | 395/704 |
| 5,812,841 | 9/1998 | Soeder | 707/6 |
| 5,903,895 | 5/1999 | Hoffman et al. | 707/101 |

FOREIGN PATENT DOCUMENTS 5-327518  12/1993  Japan .

OTHER PUBLICATIONS

Hart et al, A Scaleable, Automated Process for Year 2000 System Correction, PROC 18th International Conference on Software Engineering, Mar. 25–30, 1996, pp. 475–84 .

*Primary Examiner*—Wayne Amsbury
*Attorney, Agent, or Firm*—Stevens, Davis, Miller & Mosher, L.L.P.

[57] ABSTRACT

In a database having date fields, years past 1999 are written in a format such as binary integer format or binary-coded decimal format, either of which can be signed or unsigned. In the binary-coded decimal format, two bytes generally used to indicate the last two digits of the year can instead be used to indicate a sign and three digits. If the number of years elapsed since 1900 is used, the positive numbers from zero to 999 represent the years 1900–2899, while negative numbers represent years before 1900. Year data written in either of these formats can coexist with year data written in legacy formats, in which case the legacy and enterprise formats are distinguished by comparison of the binary integer value of a year datum or a portion thereof with a predetermined range or by checking one or more bits. The legacy format can be a format such as ASCII, EBCDIC or BCD Julian.

38 Claims, 6 Drawing Sheets

METHOD AND APPARATUS FOR RECORDING AND READING DATE DATA HAVING COEXISTING FORMATS

REFERENCE TO RELATED APPLICATIONS

This is a continuation-in-part of U.S. application Ser. No. 08/795,429, filed Feb. 5, 1997, now U.S. Pat. No. 5,737,735, which is a continuation-in-part of U.S. application Ser. No. 08/645,822, filed May 14, 1996, now U.S. Pat. No. 5,644,762. The disclosures of both of these prior applications are hereby incorporated by reference into the present disclosure.

FIELD OF THE INVENTION

The invention is directed to a method and apparatus for recording and reading dates both before and after Dec. 31, 1999, in existing computer-readable storage media (floppy disks, hard disks, RAM, ROM, tape media, or the like) and, more particularly, to such a method and apparatus making it possible to store both legacy data (those written in some existing format) and enterprise data (those written in a new format according to the invention) without ambiguity.

DESCRIPTION OF THE RELATED ART

In many computer applications, dates are represented in six-digit form by a concatenation of the last two digits of the year and digits representing the month and day. For example, in such applications, the date May 10, 1996, is represented in a format such as one of the following: 960510 (YYMMDD), 051096 (MMDDYY), 100596 (DDMMYY) or Julian day plus 96 (YYDDD). Each of the six digits is stored in eight bits in an appropriate storage medium in accordance with a known computer character set. One such character set, used by both IBM-compatible PC's and Macintoshes and known as ASCII (American Standard Code for Information Interchange), maps digits 0 through 9 to bytes 0011 0000 through 0011 1001. Another such character set, used by IBM mainframes and known as EBCDIC, maps digits 0 through 9 to bytes 1111 0000 through 1111 1001. Thus, in ASCII, the date May 10, 1996, is stored as 0011 1001 0011 0110 0011 0000 0011 0101 0011 0001 0011 0000, so that the year 1996 is represented as 0011 1001 0011 0110, while in EBCDIC, the date May 10, 1996 is stored as 1111 1001 1111 0110 1111 0000 1111 0101 1111 0001 1111 0000, so that the year 1996 is represented as 1111 1001 1111 0110. If the date is represented in the format 051096, the first 16 bits will be moved to be the last 16 bits. Eight-bit character sets have traditionally been favored because they can represent every character on a standard keyboard and still have room left over for control codes, line-draw characters, or accented letters.

In another known encoding scheme, each digit is represented by a nibble (four bits), such that each digit from zero through nine is represented as 0000 through 1001. It is conventional, particularly in COBOL, for the last nibble to represent not a digit, but the sign (positive or negative) of the number represented. For example, some databases represent a Julian date in six nibbles (three bytes), thus: YYDDDS. Conventionally, a positive sign is represented by 1100 or 1111 (hexadecimal C or F), while a negative sign is represented by 1011 or 1101 (hexadecimal B or D).

While the encoding schemes described above work for all dates from Jan. 1, 1900, through Dec. 31, 1999, they cannot store subsequent dates without confusion, inasmuch as there is no provision for distinguishing, for example, May 10, 2096, from May 10, 1996.

One known encoding scheme involves using an enterprise format which has more space to indicate the year than the legacy format. One technique is to extend the date fields in databases from six bytes to eight (e.g., from YYMMDD to CCYYMMDD) so that every year from one through 9999 has a unique representation in the enterprise format. However, the implementation of such a solution on an existing computer that does not already use it would require a burdensome process of rewriting much date information already stored. In particular, since all the year data would have to be rewritten at once, crucial systems might have to be taken off-line for long periods of time. In the short term, a data file using the legacy format and a data file using the enterprise format could coexist in the same application through the use of a bridging technique by which years from both files are converted into a common format which the application can use. However, such a bridging technique, besides being cumbersome, does not render the file using the legacy format year-2000 compliant.

Another solution involves determining the century from the last two digits of the year by a range into which the last two digits fall, the source of the year information, or a combination of the two. In one such technique, two-digit numerals above a certain cutoff are assumed to represent years in the twentieth century, while two-digit numerals below the cutoff are assumed to represent years in the twenty-first century. For example, the numerals 28–99 can represent the years 1928–1999, while the numerals 00–27 can represent the years 2000–2027. Other techniques are more complex. For example, several ranges of two-digit numerals can be established, each being assigned to either the twentieth or the twenty-first century. For example, the two-digit numerals 50–59 and 70–79 may indicate the years 1950–1959 and 1970–1979, while the two-digit numerals 60–69 may indicate the years 2060–69. Moreover, an application can interpret dates according to their source; for example, an application may interpret the two-digit numeral 69 to be 1969 if it comes from a data file of birth dates or 2069 if it comes from a data file of expiration dates. These techniques avoid the difficulty of rewriting all year data, but has its own problems. For example, it is incapable of handling different dates spanning more than a century. Thus, only a limited range of legacy data can coexist with the enterprise data. Second, all systems accessing any given database must agree beforehand on the cutoff, or data will be interpreted erroneously. Third, these techniques offer only a short-term solution, as they merely transform the year-2000 crisis into a later crisis. Fourth, these techniques complicate determination of the day of the week. A variation of this technique involves advancing the cutoff during the lifetime of the database, such that the century of usable dates is successively redefined as 1929–2028, 1930–2029, etc. However, besides its complexity, this technique merely aggravates the problems of having all systems agree on a cutoff and of determining the day of the week.

SUMMARY OF THE INVENTION

The present invention provides a solution to the above-noted problems, that solution being based on the following realization. In legacy formats such as the two-digit ASCII and EBCDIC formats described above, whichever character set is used for mapping digits 0 through 9, the range of two-byte sequences needed to represent all sets of two digits from 00 through 99 is a small subset of all possible two-byte sequences; this range has as its bounds the two-byte sequences needed to represent 00 and 99. For example, in ASCII, the range is 0011 0000 0011 0000 through 0011 1001

0011 1001 inclusive. Similarly, in EBCDIC, the range is 1111 0000 1111 0000 through 1111 1001 1111 1001 inclusive. Thus, even if both ASCII and EBCDIC are in use, all two-byte sequences falling outside these ranges are unused and are thus available for a legacy format.

The significance of that realization becomes even more striking when the integer values of the two-byte sequences are expressed in base 10. A sequence of two eight-bit bytes can represent any value from zero through $2^{16}-1=65,535$. The integer values of ASCII 00 and ASCII 99 are 12,336 and 14,649, respectively. The integer values of EBCDIC 00 and EBCDIC 99 are 61,680 and 63,993, respectively. That is, the ranges 0–12,335, 14,650–61,679 and 63,994–65,535 are unused in these two legacy formats. Of course, if the bit sequences are taken to represent signed rather than unsigned binary integers, numerical values associated with the ranges change, but the underlying concepts do not. Those skilled in the art will readily appreciate the minor modifications to be made.

The present solution achieves the above-described object by using at least one of these unused ranges to integrate at least two formats (legacy and enterprise) for encoding the year data in the following manner. Existing date data (known as "legacy data" or "old-format data") are unchanged. For new date data (known as "enterprise data" or "new-format data"), including all data indicating dates after Dec. 31, 1999, the integer value of the year number is represented in binary format, and the binary representation is written in the two bytes already allocated for the year. At the very least, using the range 0–12,335, all years from one through 12,335 can be represented in this manner without conflict with existing date data. As an example, the year 2096 is represented as 0000 1000 0011 0000, which does not conflict with the ASCII or EBCDIC representation of any two digits.

In reading out a date, the legacy and enterprise data are distinguished in the following manner. First, the integer value of the two bytes of data written into the year value is determined. If this integer value is below 12,336, the integer value itself is taken to be the number of the year. If this integer value is in the range from 12,336 through 14,649 inclusive, the year is determined to have been written in ASCII format and is treated accordingly. If this integer value is in the range from 61,680 through 63,993 inclusive, the year is determined to have been written in EBCDIC and is treated accordingly.

Of course, the ranges 14,650–61,679 and 63,994–65,535 could be similarly used in the enterprise format. If they are, it is preferable to add an offset to the year; for example, all years may be augmented by 13,000 so that, e.g., the year 2000 is represented as 15,000.

An enterprise year datum is written in the following fashion. The year is expressed in binary integer format. The year written in binary integer format is written into the year field.

When a year datum is read, the bits read are taken to represent a binary integer, and the integer value is calculated. The integer value is compared with the ranges for ASCII, EBCDIC and the integer format described above and is treated accordingly. If the integer value falls outside any of these ranges, an error message can be given.

A data format used in conjunction with the technique set forth above includes multiple records, each having a year field containing a year datum representing a year and other fields which can contain any information desired to be associated with the year. Records having year data written in enterprise and legacy format can be intermixed with no ambiguity.

A computing device suitable for implementing the operations set forth above includes a storage, a read/write device which reads from and writes to the storage under control of a microprocessor or other processor, thus allowing data exchange between the storage and the processor. The processor has logic circuitry with comparing capabilities and year determining capabilities for performing the operations described above. The computing device could be, e.g., an appropriately programmed IBM-compatible PC, Macintosh, mainframe or any sized computer (micro, mini, super and mainframe). The device can also include any or all of an input (e.g., a keyboard), a printer and a display as needed.

It is an object of the invention to write date data indicating dates in a span of over a century without expanding the space required for year information beyond two bytes.

It is a further object of the invention to write date data indicating dates in a span of over a century such that the legacy and enterprise data can coexist thus avoiding a need to rewrite legacy date data in an enterprise format in databases or the like.

To achieve these and other objects, a first embodiment of the present invention is directed to a series of operational steps to be performed on or with the aid of a computer, said steps comprising: (a) reading a year datum from a computer-readable storage medium, the year datum representing a year; (b) examining the year datum to determine whether the year datum comprises an ASCII representation of the year; (c) if the year datum comprises the ASCII representation, determining the year from the year datum in accordance with the ASCII representation; and (d) if the year datum does not comprise the ASCII representation, taking the year datum to comprise a representation of the year in an enterprise format which is neither ASCII nor EBCDIC and determining the year from the year datum in accordance with the enterprise format. This series of operational steps can be modified for cases in which the year datum may comprise an EBCDIC representation of the year or may comprise a representation of the year in either ASCII or EBCDIC. The first embodiment is further directed to a series of operational steps to be performed on or with the aid of a computer, said steps comprising: (a) providing a computer-readable storage medium having a first year field for storing a first year datum representing a first year and a second year field in which a second year datum representing a second year has been written, the second year datum comprising two bytes representing two decimal digits of the second year; (b) deriving the first year datum from the first year such that the first year datum comprises a representation of at least three digits of a number used to represent the first year in an enterprise format which is neither ASCII nor EBCDIC; and (c) writing the first year datum in the first year field.

A second embodiment of the present invention is directed to a series of operational steps to be performed on or with the aid of a computer, said steps comprising: (a) reading a date datum from a computer-readable storage medium, the date datum representing at least a year; (b) examining the date datum to determine whether the date datum comprises a representation of the year in a binary-coded decimal format; (c) if the date datum comprises the binary-coded decimal representation, determining the year from the date datum in accordance with the binary-coded decimal format; and (d) if the date datum does not comprise the binary-coded decimal representation, taking the date datum to comprise a representation of the year in a binary integer format and determining the year from the date datum in accordance with the binary integer format. The second embodiment is further directed to a series of operational steps to be performed on or with the aid of a computer, said steps comprising: (a) providing a computer-readable storage medium having a first date field for storing a first date datum representing at least a first year and a second date field in which a second date datum representing at least a second year has been written, the second date datum expressing the second year in a binary-coded decimal format; (b) deriving the first date datum from the first year such that the first date datum comprises a representation of the first year in a binary integer format; and (c) writing the first date datum in the first year field.

If the enterprise format is a packed decimal format with a sign indicator, the years can be numbered from 000 through 999 from some arbitrary starting point, or pivot point. For many systems, the simplest starting point is 1900. Then, existing representations of the years 1900–1999 can simply be packed into the binary-coded decimal representations for 000–099, and additional years through 2899 can be accommodated. Furthermore, if the pivot point for the enterprise data is 1900, and if the legacy format does not employ windowing, the year can be derived from either a legacy datum or an enterprise datum simply by reading out the number and adding 1900. A negative sign can be used to store years before 1900; for example, the year 1899 can be stored simply as −001. Thus, a range of 1,999 years can be represented, namely, the pivot point, all years through 999 years after the pivot point, and all years through 999 years before the pivot point. The sign indicator is generally in the lowest-order nibble (YYYS), but can be anywhere (SYYY, YSYY or YYSY).

Such a system can be modified to accommodate databases in which windowing, as described above, has already been implemented for the legacy data. For example, if the legacy data are windowed such that the numerals 50–99 represent dates from 1950–1999 and the numerals 00–49 represent dates from 2000–2049, the pivot point for the enterprise format can be 1950 for the sake of consistency and ease of calculation. Of course, the more complicated windowing schemes described above can be accommodated by appropriate modifications which those skilled in the art will appreciate.

With this system, it is not necessary to rewrite legacy data. Instead, one or more bits, such as the nibble which in binary-coded decimal format contains the sign bit, can be tested. As noted above, the ASCII representations of all digits begin with 0011, while the EBCDIC representations of all digits begin with 1111. Thus, if the highest-order nibble is the one to be tested, a value of 0011 indicates ASCII, and a value of 1111 indicates EBCDIC, while any other value indicates binary-coded decimal. On the other hand, if the lowest-order nibble is the one to be tested, a value of 0000 through 1001 indicates either ASCII or EBCDIC (another nibble being tested to determine which), while a value of 1010 through 1111 indicates binary-coded decimal. As noted above, in one known BCD format, the lowest-order nibble is always 1011, 1100, 1101 or 1111.

In addition to testing one or more bits, it is also possible to calculate a binary integer value of the bits used to write a year datum, or of a subset of the bits, and compare the binary integer value with one or more ranges to determine whether the datum is in legacy or enterprise format. For any possible ASCII or EBCDIC representation of a year, such a binary integer value will fall within a certain range. Thus, sequences of bits whose binary integer values fall outside that range are available for a suitably designed enterprise format.

BRIEF DESCRIPTION OF THE DRAWINGS

A preferred embodiment of the invention will now be set forth in detail with reference to the drawings, in which.

DETAILED DESCRIPTION OF THE PREFERRED EMBODIMENT

A first embodiment of the invention will now be described in detail with reference to FIGS. 1, 2, 3A, 3B and 4.

Figure 1:
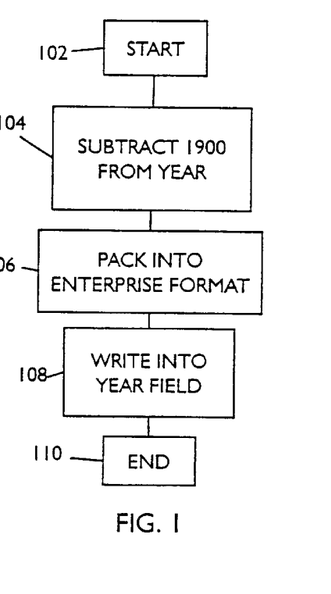
FIG. 1 shows a flow chart showing the operation of writing a year in accordance with a first embodiment of the present invention.

FIG. 1 shows the operations involved in writing a year datum in accordance with the first embodiment. It is contemplated that this operation will be used on and after Jan. 1, 2000, although it could be implemented at any time.

The operation starts at step 102. In step 104, 1900 is subtracted from the year. For example, if the year to be written is 2000, 1900 is subtracted from 2000 to obtain 100. In step 106, the result of step 104 is packed into the enterprise format desired to be used (such as a binary-coded decimal representation, a signed binary integer, or an unsigned binary integer) by any suitable packing routine; such packing routines will be well within the grasp of those skilled in the art who have reviewed this disclosure. In step 108, the representation in the enterprise format is written into the medium. In step 110, the operation ends.

Any suitable starting year may be used in place of 1900. For example, if the legacy data are windowed such that 50–99 represent the years 1950–1999 and 00–49 represent the years 2000–2049, the starting year or pivot point can be 1950. Alternatively, if no sign indication is used, and if it is desired to write four digits of the year, step 104 can be dispensed with.

Once year data have been written as shown in FIG. 1, and until it is known that every single year datum has been written thus, a year datum to be read can be in either legacy format (the format previously in use by the system, which can be ASCII, EBCDIC or some other known format) or enterprise format (such as the BCD format, signed binary integer format or unsigned binary integer format used in the preferred embodiment). Two techniques will be described for distinguishing data in the legacy format from data in the enterprise format.

The first technique depends on the fact that the legacy format or formats take up only a small subset of all possible sequences of sixteen bits. As explained in my U.S. Pat. No. 5,644,762, issued Jul. 1, 1997, all possible ASCII representations of two digits fall within a range from 0011 0000 0011 0000 through 0011 1001 0011 1001 inclusive, namely, a range of sixteen-bit sequences having binary integer values from 12,336 to 14,649 inclusive. Similarly, all possible EBCDIC representations of two digits fall within a range having binary integer values from 61,680 to 63,993 inclusive. A sequence of sixteen bits whose binary integer value falls outside the range for the legacy format is treated as being in the enterprise format. The following table makes this point clear:

value of a subset of the sequence of bits can be calculated in step 204 and used. For example, each of the highest-order nibble and the third-highest-order nibble is always 0011 in ASCII and always 1111 in EBCDIC, while in both ASCII and EBCDIC, each of the second-highest-order nibble and the lowest-order nibble is always in a range from 0000 through 1001 inclusive. In BCD, if the sign is in the lowest

| Byte: | | | | | | | | Byte: | | | | | | | | hex code | unsigned integer value |
|---|---|---|---|---|---|---|---|---|---|---|---|---|---|---|---|---|---|
| F | E | D | C | B | A | 9 | 8 | 7 | 6 | 5 | 4 | 3 | 2 | 1 | 0 | | |
| 0 | 0 | 1 | 1 | 0 | 0 | 0 | 0 | 0 | 0 | 1 | 1 | 0 | 0 | 0 | 0 | ASCII 00 | 12,336 |
| 1 | 1 | 1 | 1 | 0 | 0 | 0 | 0 | 1 | 1 | 1 | 1 | 0 | 0 | 0 | 0 | EBCDIC 00 | 61,680 |
| 3 | 1 | 8 | 4 | 2 | 1 | 5 | 2 | 1 | 6 | 3 | 1 | 8 | 4 | 2 | 1 | Binary place values (for unsigned integers) | |
| 2 | 6 | 1 | 0 | 0 |  | 5 |  | 2 | 4 | 2 | 6 | | | | | | |
| 7 | 3 | 9 | 9 | 4 | 2 | 2 | 6 | 8 | | | | | | | | | |
| 6 | 8 | 2 | 6 | 8 | 4 | | | | | | | | | | | | |
| 8 | 4 | | | | | | | | | | | | | | | | |
| s 1 | 8 | 4 | 2 | 1 | 5 | 2 | 1 | 6 | 3 | 1 | 8 | 4 | 2 | 1 | | Binary place values (for signed integers) | |
| i 6 | 1 | 0 | 0 | 0 | 1 | 5 | 2 | 4 | 2 | 6 | | | | | | | |
| g 3 | 9 | 9 | 4 | 2 | 2 | 6 | 8 | | | | | | | | | | |
| n 8 | 2 | 6 | 8 | 4 | | | | | | | | | | | | | |
| 4 | | | | | | | | | | | | | | | | | |
| 0 | 0 | 0 | 0 | 0 | 1 | 1 | 1 | 1 | 1 | 0 | 1 | 0 | 0 | 0 | 0 | Binary integer 2000 (signed or unsigned) | |
| 0 | 0 | 0 | 0 | 1 | 1 | 1 | 1 | 1 | 1 | 1 | 1 | 1 | 1 | 1 | 1 | Binary integer 4095 (signed or unsigned) | |
| 1 | 1 | 1 | 1 | 0 | 0 | 0 | 0 | 0 | 0 | 0 | 0 | 0 | 0 | 0 | 0 | Binary integer −4095 (signed) | |
| 100 | | | | 10 | | | | 1 | | | | sign | | | | BCD place values (assuming that sign is in lowest order) | |
| 0 | 0 | 0 | 1 | 0 | 0 | 0 | 0 | 0 | 0 | 0 | 0 | 1 | 1 | 1 | 1 | Signed BCD representation of 100 (assuming that sign is in lowest order and that 1111 indicates +) | |

Figure 2:
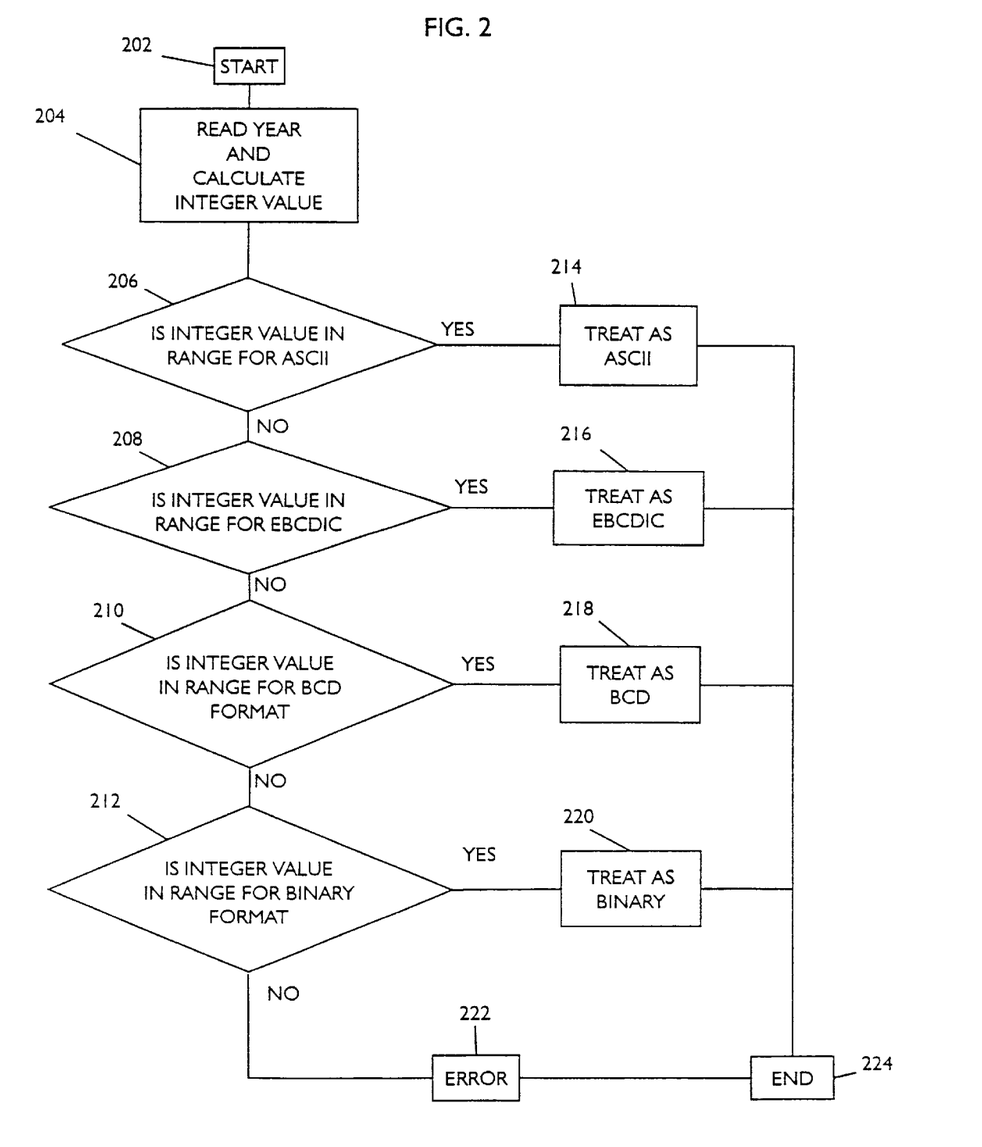
FIG. 2 shows a flow chart showing a first technique for reading a year in accordance with the first embodiment of the present invention.

FIG. 2 shows a flow chart of the first technique. The operation begins in step 202. In step 204, the year datum is read, and a binary integer value of the bits used to write the year datum is calculated. The integer value is compared with the ranges for ASCII (step 206), EBCDIC (step 208) the BCD format described above for the invention (step 210) and the binary integer format described above for the invention (step 212) and is treated accordingly (steps 214–220). If the integer value falls outside any of these ranges, an error message can be given (step 222). The operation then ends (step 224).

The flow chart of FIG. 2 is as complicated as it is because it assumes an extreme case, namely, that legacy data can be in either ASCII or EBCDIC and that enterprise data can be in either BCD or binary integer format. In most practical cases, however, there will be a single format for the legacy data, a single format for the enterprise data or a single format for each of the legacy data and the enterprise data; thus, the number of steps can be reduced from those shown in FIG. 2. Also, if the legacy data are in a format other than ASCII or EBCDIC, the ranges used in the comparison are adjusted accordingly.

While the description of the operational steps in FIG. 2 assumes that an unsigned binary integer value is calculated, a signed binary integer value can alternatively be calculated. Those skilled in the art will readily appreciate the minor modifications which need to be made to use the signed binary integer value.

Instead of determining a binary integer value of the entire sequence of bits used in the year datum, a binary integer order nibble, that nibble is in the range from 1010 to 1111 inclusive. Thus, the binary integer value (signed or unsigned) of any of the nibbles is amenable to the operation of FIG. 2. Also, nibble boundaries do not have to be respected. Those skilled in the art will readily be able to determine which portion of the bit sequence can be tested in this manner to distinguish the legacy and enterprise formats used in any particular database.

The second technique relies on the fact that in the legacy data, certain bits are always on (1) or always off (0). For example, the ASCII representations of all two-digit numerals from 00 to 99 take the form 0011 xxxx 0011 where x can be either 0 or 1. Similarly, the EBCDIC representations of all two-digit numerals from 00 to 99 take the form 1111 xxxx 1111 xxxx, where x can be either 0 or 1. Thus, legacy data will always conform to a predetermined mask. By testing certain bits to determine whether they are on or off, it can be determined whether the bit sequence in the year datum falls within the mask; if not, the year datum can be treated as being in enterprise format.

Figure 3A:
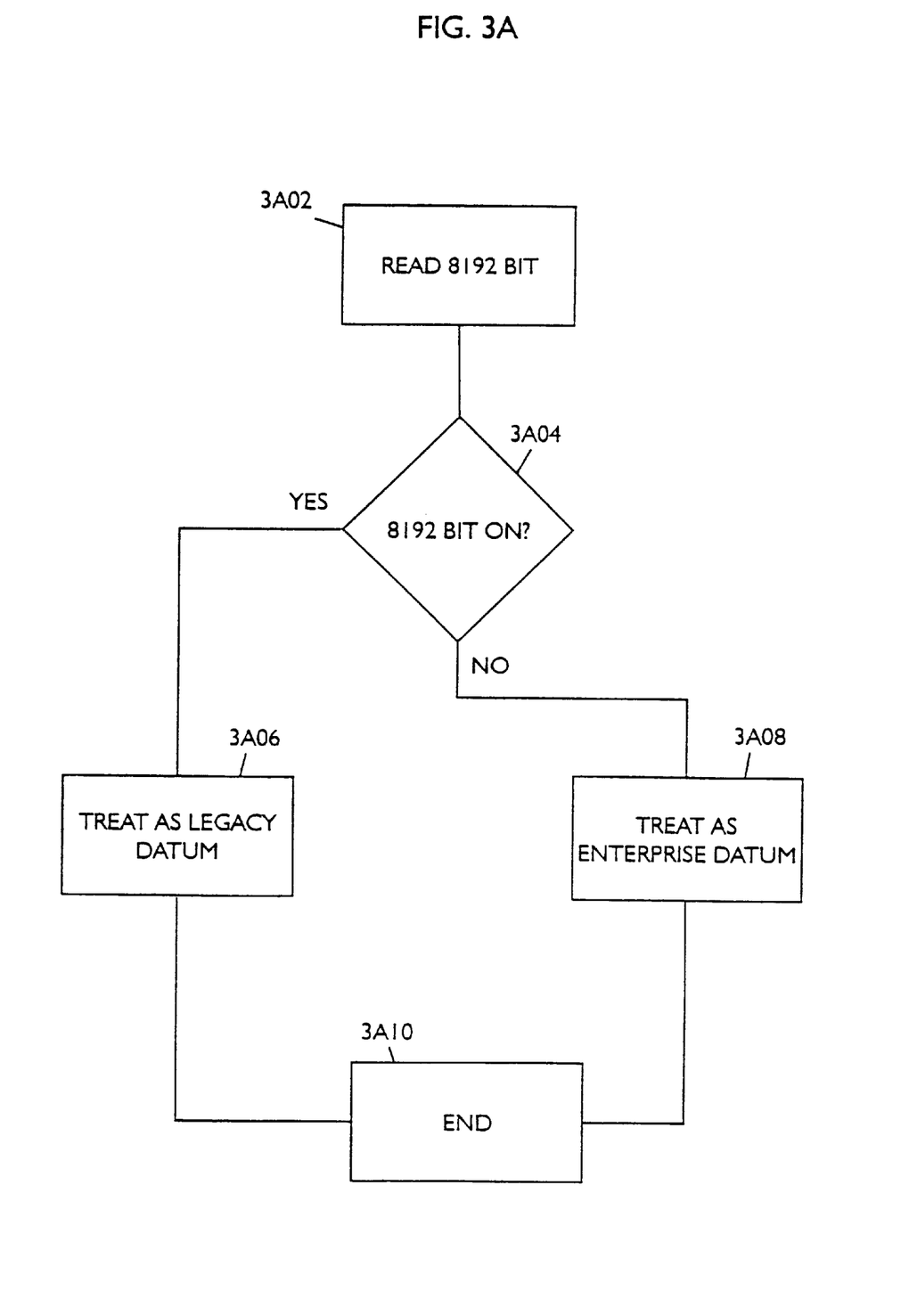
FIGS. 3A and 3B show flow charts showing a second technique for reading a year in accordance with the first embodiment of the present invention.
Figure 3B:
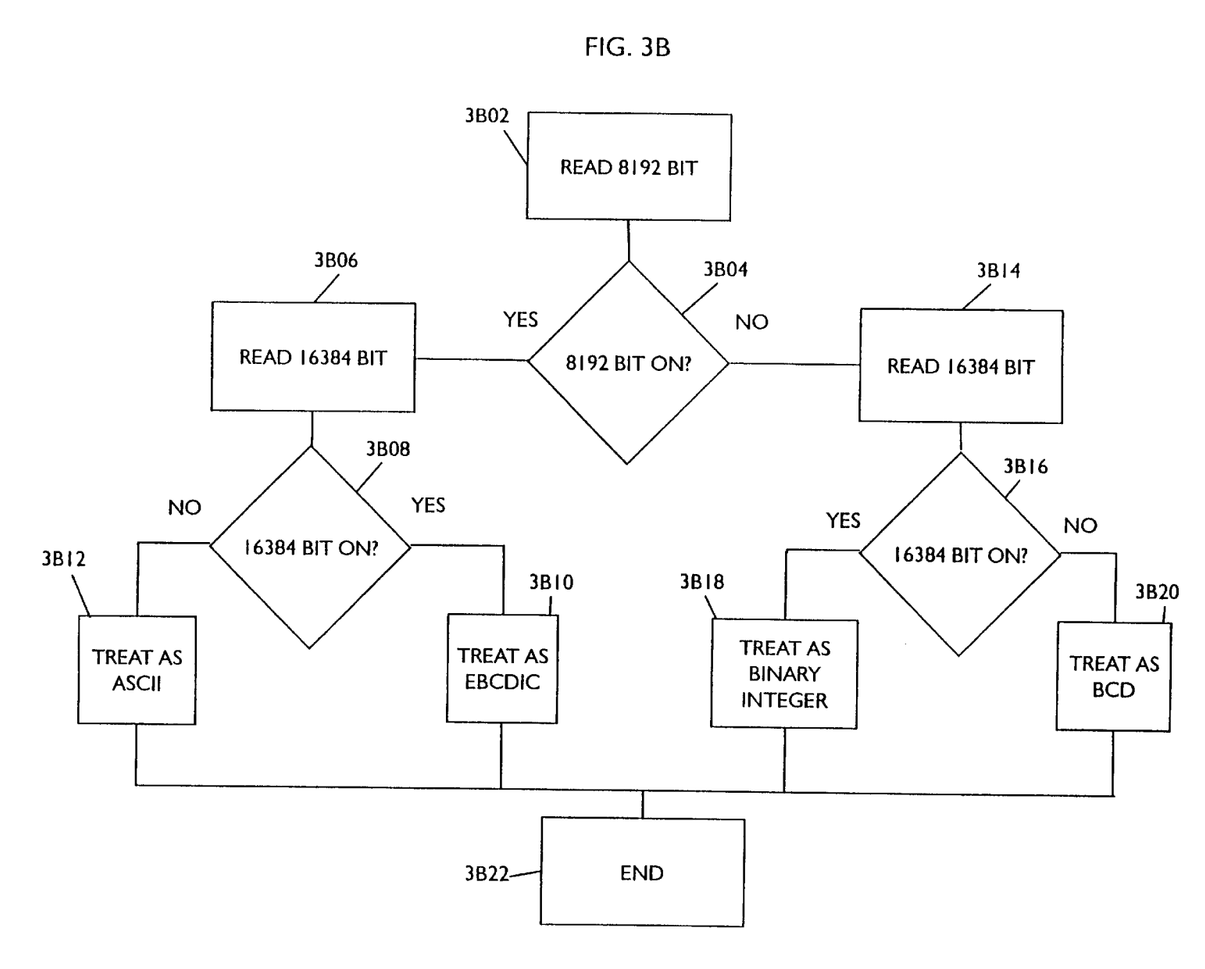

FIGS. 3A and 3B show two variations of a series of operations using this technique. The same assumptions regarding the binary-coded decimal format described above with respect to FIG. 2 will be followed. Also, for illustrative purposes only, it will be assumed that in the enterprise format, the sign occupies the lowest-order nibble and is expressed as 1011 for negative integers and 1111 for positive integers. Thus, the bit having a place value of 8,192 will always be on (have a value of one) for either ASCII or EBCDIC. On the other hand, for numbers from −199 to +199 in BCD, this bit will always be off. Therefore, this bit can be used to distinguish the legacy formats from the enterprise format, provided that the range of years in the enterprise format is restricted to the pivot point ±199 years, which is still an ample range. Of course, if the legacy format is EBCDIC, either of the two highest-order bits can be tested, in which case the range of years in the enterprise format is considerably larger.

FIG. 3A shows a simple case in which the legacy data are in a single format (either ASCII or EBCDIC) and the enterprise data are also in a single format. Thus, the format of any particular year datum can be determined unambiguously by testing the 8,192 bit.

In step 3A02, the 8,192 bit is read. In step 3A04, this bit is tested to determine whether it is on. If so, the year datum is treated as a legacy datum in step 3A06. Otherwise, the year datum is treated as an enterprise datum in step 3A08. Either way, the operation ends in step 3A10.

FIG. 3B shows a more complicated case in which the legacy data can be in either of two formats (ASCII and EBCDIC) and in which the enterprise data can be in either of two formats (binary integer and binary-coded decimal). In such a case, every year datum is tested twice.

To make the operations of FIG. 3B workable, it will be necessary to impose some restriction on the range of binary integer data, similar to the limitation on BCD data described above. For example, since all sixteen-bit sequences begin with 0011 for ASCII, 1111 for EBCDIC and either 0000 or 0001 for BCD year data within the range of −199 to +199 inclusive, binary integer data can be limited such that they all begin, for example, with 0100.

In the year datum, the bit having a place value of 8,192 is read in step 3B02. In step 3B04, it is determined whether the 8,192 bit is on (has a value of one) or is off (has a value of zero). If the 8,192 bit is on, as noted above, the year datum can be in either ASCII or EBCDIC; otherwise, the year datum can be in either binary integer format or BCD format.

If the legacy data can be in either EBCDIC or ASCII, it is necessary to determine which legacy format is used for any particular legacy datum. To do so, the 16,384 bit can be read in step 3B06 and checked in step 3B08. If this bit is on, the year datum is treated as EBCDIC in step 3B10. If this bit is off, the year datum is treated as ASCII in step 3B12.

If it is determined in step 3B04 that the 8,192 bit is off, it is necessary to determine which enterprise format is used for any particular enterprise datum. To do so, if the limitation on binary integer data described above is implemented, the 16,384 bit can be read in step 3B14 and checked in step 3B16. If this bit is on, the year datum is treated as a binary integer in step 3B18. If this bit is off, the year datum is treated as BCD in step 3B20. Whichever format is detected, the operation ends in step 3B22.

Of course, the 8,192 bit is not the only bit that can be tested. If it is known that only one legacy format (one or the other of ASCII or EBCDIC) is in use, any or all of the four highest-order bits can be tested, and the number of steps can be reduced correspondingly. Similarly, if it is known that only one enterprise format is in use, steps 3B14 and 3B16 can be dispensed with. Furthermore, if the enterprise format uses the lowest-order nibble (four bits) to indicate the sign, bits in the lowest-order nibble can be tested. Moreover, if the legacy data are in Julian format, a different bit or bits can be tested.

Figure 4:
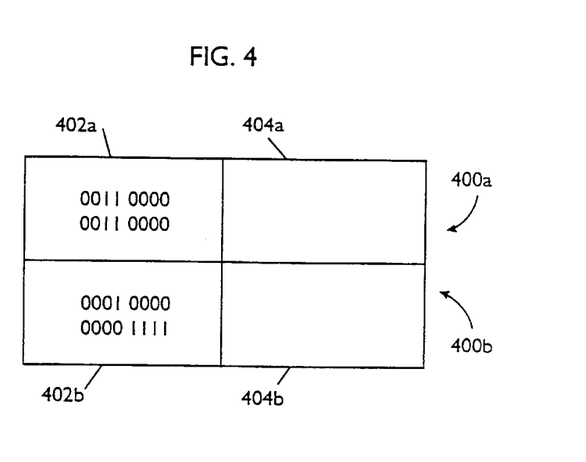
FIG. 4 shows sample data records in a database used with the first embodiment of the present invention.

FIG. 4 shows a data structure for use with the operations described above. Data record 400a includes year field or datum 402a and other fields 404a; similarly, data record 400b includes year field or datum 402b and other fields 404b. The other fields can contain any information desired to be associated with the year.

Year field 402a contains the bits 0011 0000 0011 0000. These bits correspond to ASCII 00 and are interpreted as indicating the year 1900.

Year field 402b contains the bits 0001 0000 0000 1111. In the enterprise format, given the assumptions noted above, the lowest-order nibble indicates a positive integer, while the remaining three nibbles indicate the digits 100. Thus, these bits correspond to +100 in BCD and are interpreted as indicating the year 2000.

Either of the techniques shows in FIGS. 2, 3A and 3B can readily identify that the year datum in year field 402a is written in ASCII format, while the year datum in year field 402b is written in BCD format. Thus, both year data are written unambiguously.

Figure 5:
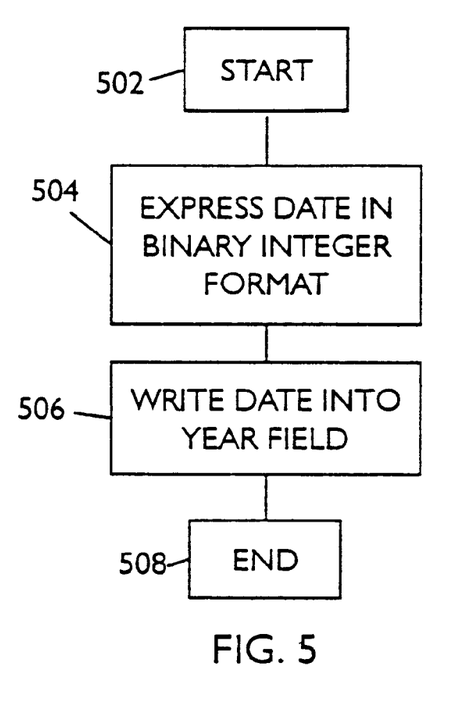
FIG. 5 shows a flow chart showing the operation of writing a date in accordance with a second embodiment of the present invention.

The second embodiment of the invention will now be described in detail with reference to FIGS. 5–7.

A somewhat more complicated case than that of the first embodiment is presented if the legacy format is neither ASCII nor EBCDIC, but is instead the binary-coded decimal format noted above, in which three bytes (six nibbles) are used to represent, e.g., a year, month and day (YYMMDD) or two year digits, three day digits and a sign (YYDDDS). There is no room for expansion, and the invariant portions of the ASCII and EBCDIC bytes are not available for testing. However, two possibilities suggest themselves. First, the highest-order nibble in the BCD format must be between 0000 and 1001 inclusive. Thus, nibbles 1010 through 1111 inclusive are available for a binary integer format. Since these additional nibbles can be used to represent decades designated 10 through 15, they can be used to represent the years 2000 through 2050. Alternatively, the year can be represented in a pure binary integer format starting with 1010 0000 (160) and ranging up to 1111 1111 (255). Thus, by subtracting 1840 from the year in the enterprise format, the years 2000 through 2095 can be mapped to bytes in this range. Of course, if the year and day are both represented in a pure binary integer format starting with 1010 0000 0000 0000 0000 0000, the range becomes even larger. Second, if the date is expressed in Julian format with a sign, because the nibble representing the sign in the BCD format can have only two possible values (one each for positive and negative), all fourteen other possible values are available for a new binary format. For example, the date can be encoded in binary integer format in the highest-order five nibbles, while the lowest-order nibble can have an arbitrary value which does not conflict with the nibbles used to represent signs in BCD. Either of these possibilities is amenable to a testing procedure based on the testing procedure of FIG. 2, FIG. 3A or FIG. 3B.

An embodiment of the principles explained in the preceding paragraph will now be explained with reference to FIGS. 5–7. FIG. 5 shows the operational steps used in writing an enterprise datum. The operation starts in step 502. In step 504, the date is expressed in binary integer format. In step 506, the date is written into the date field. In step 508, the operation ends.

Figure 6:
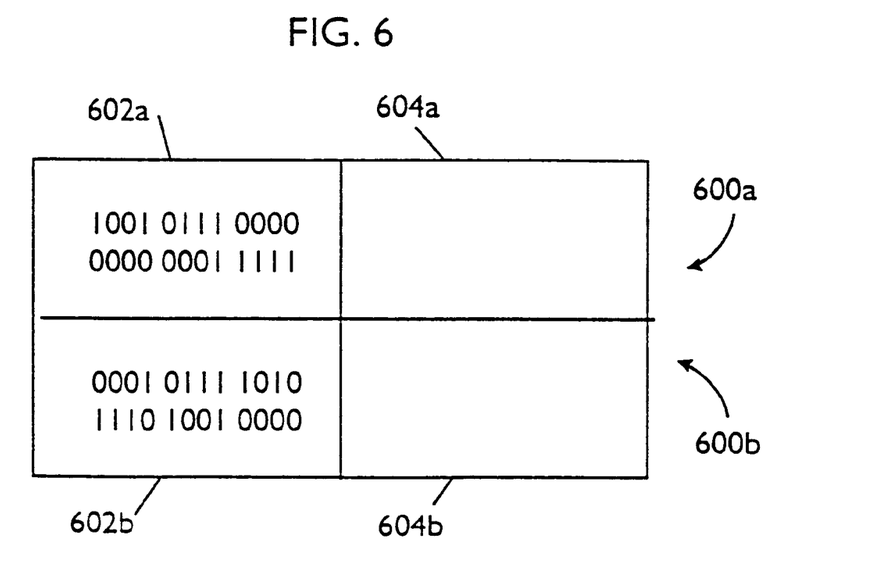
FIG. 6 shows sample data records in a database used with the second embodiment of the present invention.

FIG. 6 shows a data structure for use with this embodiment. The data structure includes records 600a and 600b. Record 600a includes date field 602a and additional fields 604a, which can include any information desired to be associated with the date. Similarly, record 600b includes date field 602b and additional fields 604b, which can include any information desired to be associated with the date.

Date field 602a includes the bits 1001 0111 0000 0000 0001 1111. These bits represent the digits 97001 and a + sign and thus indicate the date Jan. 1, 1997.

Date field 602b includes the bits 0001 0111 1010 1110 1001 0000. For illustrative purposes only, it will be assumed that in the enterprise format, the lowest-order nibble is always 0000. Then, the five highest-order nibbles are available to represent any unsigned binary integer from zero through $2^{20}-1=1,048,575$ or any signed binary integer between $\pm(2^{19}-1)=\pm524,287$ inclusive. In date field 602b, the bits represent the number 97,001. In a Julian YYDDD representation, this number can represent the date Jan. 1, 1997. Of course, the binary integer could alternatively be the number of days from some starting day.

Figure 7:
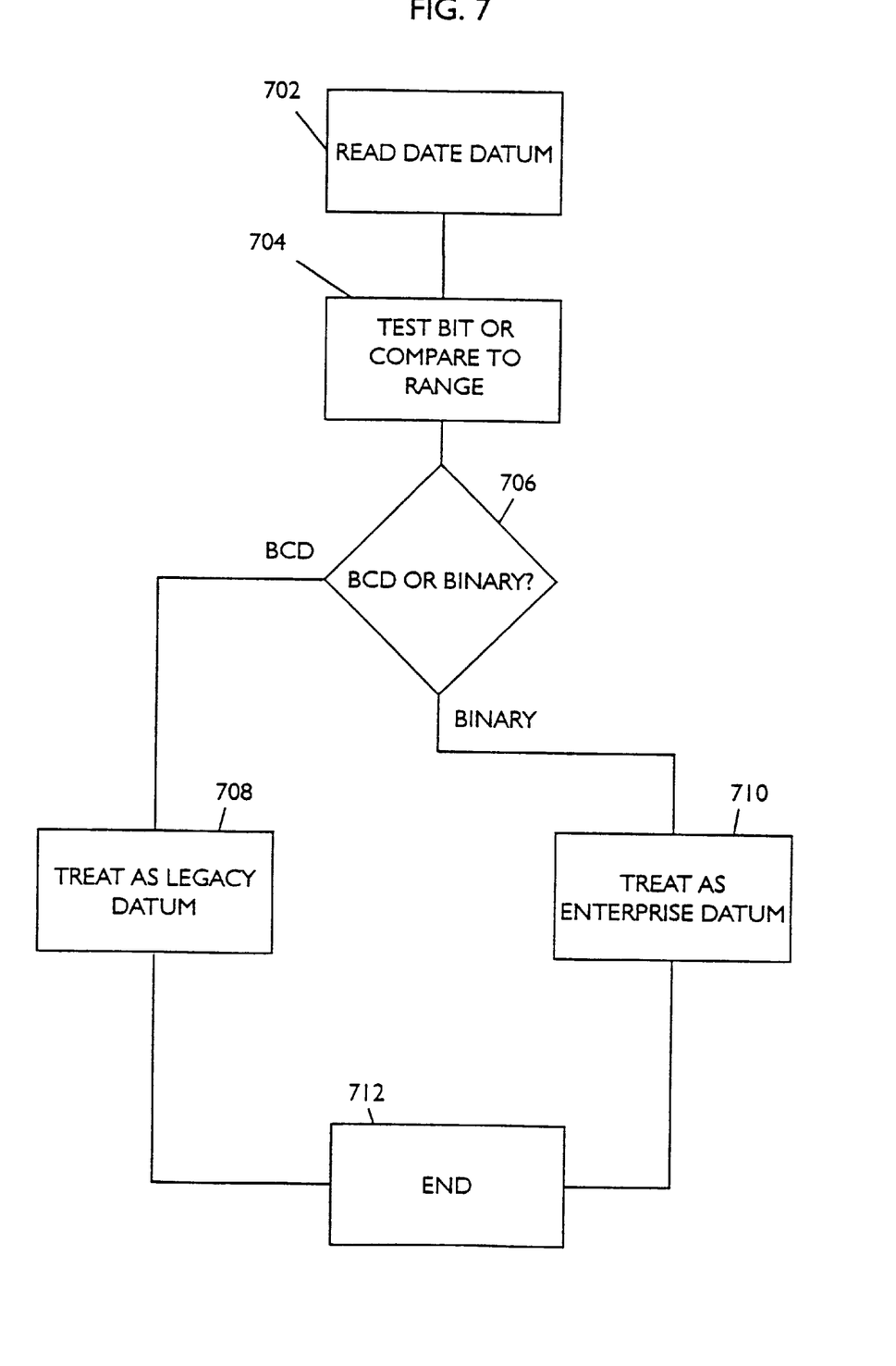
FIG. 7 shows a flow chart showing a technique for reading a date in accordance with the second embodiment of the present invention.

Date fields 602a and 602b can be distinguished through an operation such as that shown in FIG. 7. In step 702, the date datum is read out. In step 704, the date datum is tested by testing one or more bits or comparing the binary integer value of some or all of the bits in the date datum to one or more ranges; the operations shown in FIGS. 2, 3A and 3B can easily be adapted for this purpose. In step 706, it is determined whether the date datum is in BCD (legacy) or binary (enterprise) format. In accordance with this determination, the year datum is treated as a legacy datum in step 708 or as an enterprise datum in step 710. Either way, the operation ends in step 712.

Figure 8:
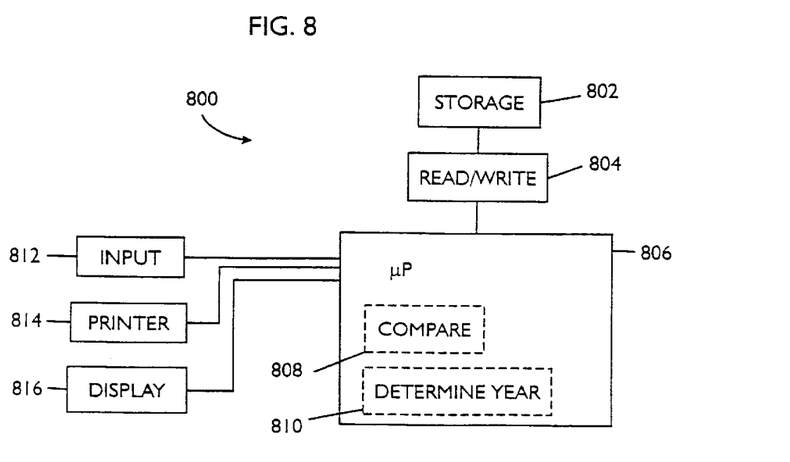
FIG. 8 shows a computing device for use with either embodiment of the present invention.

FIG. 8 shows a computing device for implementing either of the above-described embodiments or any embodiment of the invention. Computing device 800 includes storage 802 for storing the data records of FIGS. 4 or 6. Read/write device 804 reads from and writes to the storage under control of a processor such as microprocessor 806, thus allowing data exchange between the storage and the microprocessor. The microprocessor or other processor has logic circuitry with comparing capabilities 808 and year determining capabilities 810 for performing the operations of at least one of FIGS. 2, 3A, 3B and 7. The computing device could be, e.g., an appropriately programmed IBM-compatible PC, Macintosh, mainframe or any sized computer (micro, mini, super and mainframe). The device can also include any or all of input 812 (e.g., a keyboard), printer 814 and display 816 as needed.

The testing of bits can be modified for other encoding schemes for the enterprise data. An example will be considered in which year data for all years 1900–1999 are encoded in the normal format (ASCII or EBCDIC) for legacy data, but years past 1999 are encoded using characters which are not necessarily digits, e.g., A0 for 2000, B0 for 2010, etc. In ASCII, the digits 0 through 9 are represented as bytes 0011 0000 through 0011 1001, so that the higher-order four bits are always 0011. However, the capital letters A through Z are represented as bytes 0100 0001 through 0101 1010, so that the higher-order four bits are either 0100 or 0101 (the gap between the ASCII representations of 9 and A being filled by various punctuation marks). Therefore, testing of the bit whose place value is 16,384 distinguishes between the ASCII representations of digits and those of capital letters. Of course, similar testing could be done on other ASCII characters or on characters in character sets other than ASCII. The comparison with ranges can be similarly modified.

Another enterprise format which can be accommodated is one in which the month or day data are used to indicate the century. In one such enterprise format, months 0 1–12 are taken to be in the years 1900–99, while months 13–24 are taken to be in the years 2000–99 and so on. Those skilled in the art will appreciate the minor modifications to be made to either range comparison or bit testing to accommodate such an enterprise format. Thus, range comparison and bit testing are not necessarily limited to the bytes used to represent the year, but can be used anywhere in a date datum, whether the legacy format for such a date datum is YYMMDD, YYDDD, YY (no identification of month or day), or any other format.

The operations described above can be performed on any suitable computer with the appropriate programming or can be implemented in firmware, hard-wired configuration, microcode, or the like. The medium of FIG. 8 can be a floppy disk, a hard disk, ROM, RAM, a tape backup medium, or any other digital storage medium, as needed.

Examples of uses for the invention include the following. In a payment processing system at a bank, it is crucial to distinguish a payment due date in 2000 from one in 1900. Even commercial computer systems that do not process payments, such as airline reservation systems, frequently process date-sensitive information. Microcomputer applications, such as word processors and spreadsheets, often need to utilize information stored as date codes and thus need to be able to handle data representing all dates in which such applications will be used. This invention enables the date codes in the data base for the years 1900–1999 to remain the same, while storing dates codes for years 2000 and beyond in the binary integer format described above. The software for processing the dates codes need only be changed to include the capability of analyzing and processing date codes in both the integer-encoded format and the format involving years represented by the last two decimal digits.

While two embodiments of the invention have been described, those skilled in the art who have reviewed this specification will readily appreciate that other embodiments can be achieved. For example, the invention can be modified to accommodate different character sets previously used to encode year data, for example, by changing the ranges used in the comparison or the bit to be examined. Also, the date need not be in YYMMDD format, but can alternatively be expressed in Julian (YYDDD) format. In enterprise data, the month and day as well as the year can be in BCD. Furthermore, a starting year other than 1900 can be used. Moreover, variations disclosed separately can be combined, whether they are disclosed in conjunction with the same embodiment or different embodiments. Other variations exist for the invention, which should therefore be construed as limited only by the appended claims.

I claim:

1. A series of operational steps to be performed on or with the aid of a computer, said steps comprising:

(a) reading a date datum from a computer-readable storage medium, the date datum representing at least a year;

(b) examining the date datum to determine whether the date datum comprises a legacy ASCII representation of the year;

(c) if the date datum comprises the legacy ASCII representation, determining the year from the date datum in accordance with the legacy ASCII representation; and (d) if the date datum does not comprise the legacy ASCII representation, taking the date datum to comprise a representation of the year in an enterprise format which is neither a legacy ASCII format nor a legacy EBCDIC format and determining the year from the date datum in accordance with the enterprise format.

2. A series of operational steps as in claim 1, wherein the enterprise format is a binary integer format.

3. A series of operational steps as in claim 1, wherein the enterprise format is a binary-coded decimal format.

4. A series of operational steps as in claim 3, wherein, in step (d), the representation of the year in the binary-coded decimal format comprises:

three four-bit sequences, each representing a decimal digit of a number used to represent the year; and a sign indicator indicating a sign of the number used to represent the year in the binary-coded decimal format.

5. A series of operational steps as in claim 1, wherein step (b) comprises:

(i) examining at least one bit having a predetermined place value in the date datum to determine whether the at least one bit has a first state or a second state;

(ii) if the at least one bit has the first state, determining that the date datum comprises the legacy ASCII representation; and (iii) if the at least one bit has the second state, determining that the date datum does not comprise the legacy ASCII representation.

6. A series of operational steps as in claim 1, wherein step (b) comprises:

(i) taking at least a portion of the date datum to be a binary integer and computing a composite binary integer value of said at least a portion of the date datum;

(ii) determining whether the composite binary value falls within a first range or a second range;

(iii) if the composite binary value falls within the first range, determining that the date datum comprises the legacy ASCII representation; and (iv) if the composite binary value falls within the second range, determining that the date datum does not comprise the legacy ASCII representation.

7. A series of operational steps to be performed on or with the aid of a computer, said steps comprising:

(a) reading a date datum from a computer-readable storage medium, the date datum representing at least a year;

(b) examining the date datum to determine whether the date datum comprises a legacy EBCDIC representation of the year;

(c) if the date datum comprises the legacy EBCDIC representation, determining the year from the date datum in accordance with the legacy EBCDIC representation; and (d) if the date datum does not comprise the legacy EBCDIC representation, taking the date datum to comprise a representation of the year in an enterprise format which is neither a legacy ASCII format nor a legacy EBCDIC format and determining the year from the date datum in accordance with the enterprise format.

8. A series of operational steps as in claim 7, wherein the enterprise format is a binary integer format.

9. A series of operational steps as in claim 7, wherein the enterprise format is a binary-coded decimal format.

10. A series of operational steps as in claim 9, wherein, in step (d), the representation of the year in the binary-coded decimal format comprises:

three four-bit sequences, each representing a decimal digit of a number used to represent the year; and a sign indicator indicating a sign of the number used to represent the year.

11. A series of operational steps as in claim 7, wherein step (b) comprises:

(i) examining at least one bit having a predetermined place value in the date datum to determine whether the at least one bit has a first state or a second state;

(ii) if the at least one bit has the first state, determining that the date datum comprises the legacy EBCDIC representation; and (iii) if the at least one bit has the second state, determining that the date datum does not comprise the legacy EBCDIC representation.

12. A series of operational steps as in claim 7, wherein step (b) comprises:

(i) taking at least a portion of the date datum to be a binary integer and computing a composite binary integer value of said at least a portion of the date datum;

(ii) determining whether the composite binary value falls within a first range or a second range;

(iii) if the composite binary value falls within the first range, determining that the date datum comprises the legacy EBCDIC representation; and (iv) if the composite binary value falls within the second range, determining that the date datum does not comprise the legacy EBCDIC representation.

13. A series of operational steps to be performed on or with the aid of a computer, said steps comprising:

(a) reading a date datum from a computer-readable storage medium, the date datum representing at least a year;

(b) examining the date datum to determine whether the date datum comprises (i) a legacy ASCII representation of the year or (ii) a legacy EBCDIC representation of the year;

(c) if the date datum comprises the legacy ASCII representation, determining the year from the date datum in accordance with the legacy ASCII representation;

(d) if the date datum comprises the legacy EBCDIC representation, determining the year from the date datum in accordance with the legacy EBCDIC representation; and (e) if the date datum does not comprise the legacy ASCII representation or the legacy EBCDIC representation, taking the date datum to comprise a representation of the year in an enterprise format which is neither a legacy ASCII format nor a legacy EBCDIC format and determining the year from the date datum in accordance with the enterprise format.

14. A series of operational steps as in claim 13, wherein the enterprise format is a binary integer format.

15. A series of operational steps as in claim 13, wherein the enterprise format is a binary-coded decimal format.

16. A series of operational steps as in claim 15, wherein, in step (e), the representation of the year in the binary-coded decimal format comprises:

three four-bit sequences, each representing a decimal digit of a number used to represent the year; and a sign indicator indicating a sign of the number used to represent the year in the binary-coded decimal format.

17. A series of operational steps as in claim 15, wherein step (b) comprises:

(i) examining a plurality of bits having predetermined place values in the date datum to determine whether the plurality of bits have a first state, a second state or a third state;

(ii) if the plurality of bits have the first state, determining that the date datum comprises the legacy ASCII representation;

(iii) if the plurality of bits have the second state, determining that the date datum comprises the legacy EBCDIC representation; and (iv) if the plurality of bits have the third state, determining that the date datum does not comprise the legacy ASCII representation or the legacy EBCDIC representation.

18. A series of operational steps as in claim 15, wherein step (b) comprises:

(i) taking at least a portion of the date datum to be a binary integer and computing a composite binary integer value of said at least a portion of the date datum;

(ii) determining whether the composite binary value falls within a first range, a second range or a third range;

(iii) if the composite binary value falls within the first range, determining that the date datum comprises the legacy ASCII representation;

(iv) if the composite binary value falls within the second range, determining that the date datum comprises the legacy EBCDIC representation; and (v) if the composite binary value falls within the third range, determining that the date datum does not comprise the legacy ASCII representation or the legacy EBCDIC representation.

19. A series of operational steps to be performed on or with the aid of a computer, said steps comprising:

(a) providing a computer-readable storage medium having a first date field for storing a first date datum representing at least a first year and a second date field in which a second date datum representing at least a second year has been written, the second date datum comprising two bytes representing two decimal digits of the second year;

(b) deriving the first date datum from at least the first year such that the first date datum comprises a representation of at least three digits of a number used to represent the first year in an enterprise format which is neither a legacy ASCII format nor a legacy EBCDIC format; and (c) writing the first date datum in the first date field.

20. A series of operational steps as in claim 19, wherein the enterprise format is a binary integer format.

21. A series of operational steps as in claim 19, wherein the enterprise format is a binary-coded decimal format.

22. A series of operational steps as in claim 21, wherein the first date datum further comprises an indication of a sign associated with the number used to represent the first year.

23. A series of operational steps as in claim 22, wherein the number used to represent the first year is derived by subtracting 1900 from the year.

24. A series of operational steps as in claim 21, wherein the number used to represent the year is derived by subtracting 1900 from the year.

25. A series of operational steps to be performed on or with the aid of a computer, said steps comprising:

(a) providing a computer-readable storage medium having a first date field for storing a first date datum representing at least a first year and a second date field in which a second date datum representing at least a second year has been written, the second date datum expressing the second year in a binary-coded decimal format;

(b) deriving the first date datum from at least the first year such that the first date datum comprises a representation of the first year in a binary integer format; and (c) writing the first date datum in the first year field.

26. A series of operational steps as in claim 25, wherein the binary integer format is a signed binary integer format.

27. A series of operational steps as in claim 25, wherein the binary integer format is an unsigned binary integer format.

28. A series of operational steps as in claim 25, wherein the binary-coded decimal format is a signed binary-coded decimal format.

29. A series of operational steps as in claim 28, wherein the binary-coded decimal format comprises a representation of two digits of the year and three digits of a Julian day.

30. A series of operational steps as in claim 25, wherein the binary-coded decimal format is an unsigned binary-coded decimal format.

31. A series of operational steps as in claim 30, wherein the binary-coded decimal format comprises a representation of two digits of the year, two digits of a month and two digits of a day.

32. A series of operational steps to be performed on or with the aid of a computer, said steps comprising:

(a) reading a date datum from a computer-readable storage medium, the date datum representing at least a year;

(b) examining the date datum to determine whether the date datum comprises a representation of the year in a binary-coded decimal format;

(c) if the date datum comprises the binary-coded decimal representation, determining the year from the date datum in accordance with the binary-coded decimal format; and (d) if the date datum does not comprise the binary-coded decimal representation, taking the date datum to comprise a representation of the year in a binary integer format and determining the year from the date datum in accordance with the binary integer format.

33. A series of operational steps as in claim 32, wherein the binary-coded decimal format is a signed binary-coded decimal format.

34. A series of operational steps as in claim 33, wherein the binary-coded decimal format comprises a representation of two digits of the year and three digits of a Julian day.

35. A series of operational steps as in claim 32, wherein the binary-coded decimal format is an unsigned binary-coded decimal format.

36. A series of operational steps as in claim 35, wherein the binary-coded decimal format comprises a representation of two digits of the year, two digits of a month and two digits of a day.

37. A series of operational steps as in claim 32, wherein step (b) comprises:

(i) examining at least one bit having a predetermined place value in the date datum to determine whether the at least one bit has a first state or a second state;

(ii) if the at least one bit has the first state, determining that the date datum comprises the representation of the year in the binary-coded decimal format; and (iii) if the at least one bit has the second state, determining that the date datum does not comprise the representation of the year in the binary-coded decimal format.

38. A series of operational steps as in claim 32, wherein step (b) comprises:

(i) taking at least a portion of the date datum to be a binary integer and computing a composite binary integer value of said at least a portion of the date datum;

(ii) determining whether the composite binary integer value falls within a first range or a second range;

(iii) if the composite binary integer value falls within the first range, determining that the date datum comprises the representation of the year in the binary-coded decimal format; and (iv) if the composite binary integer value falls within the second range, determining that the date datum does not comprise the representation of the year in the binary-coded decimal format.

* * * * *